Figure 6:
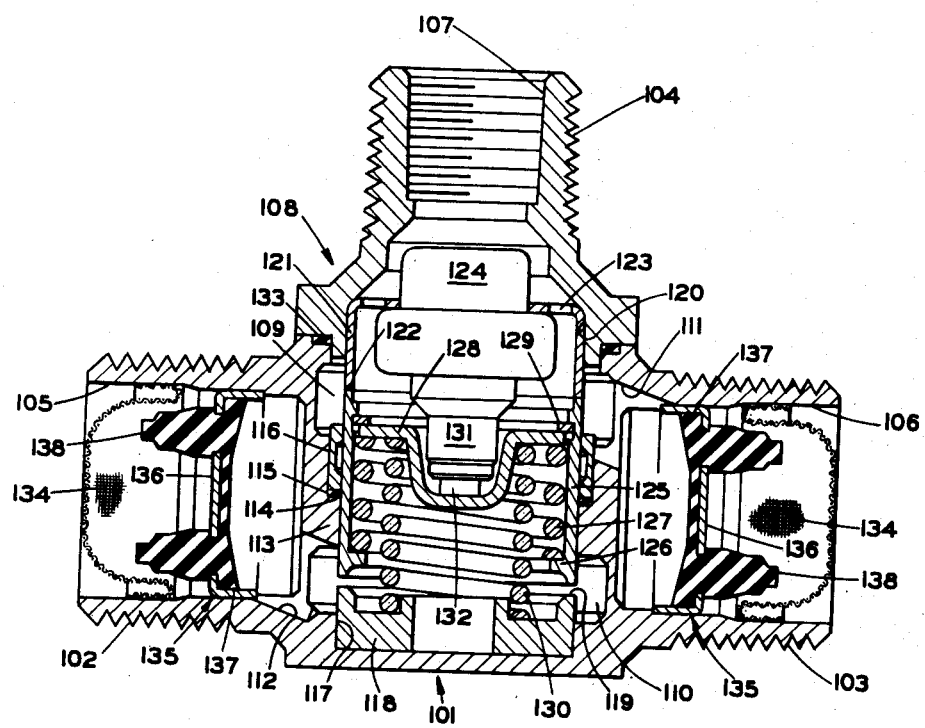

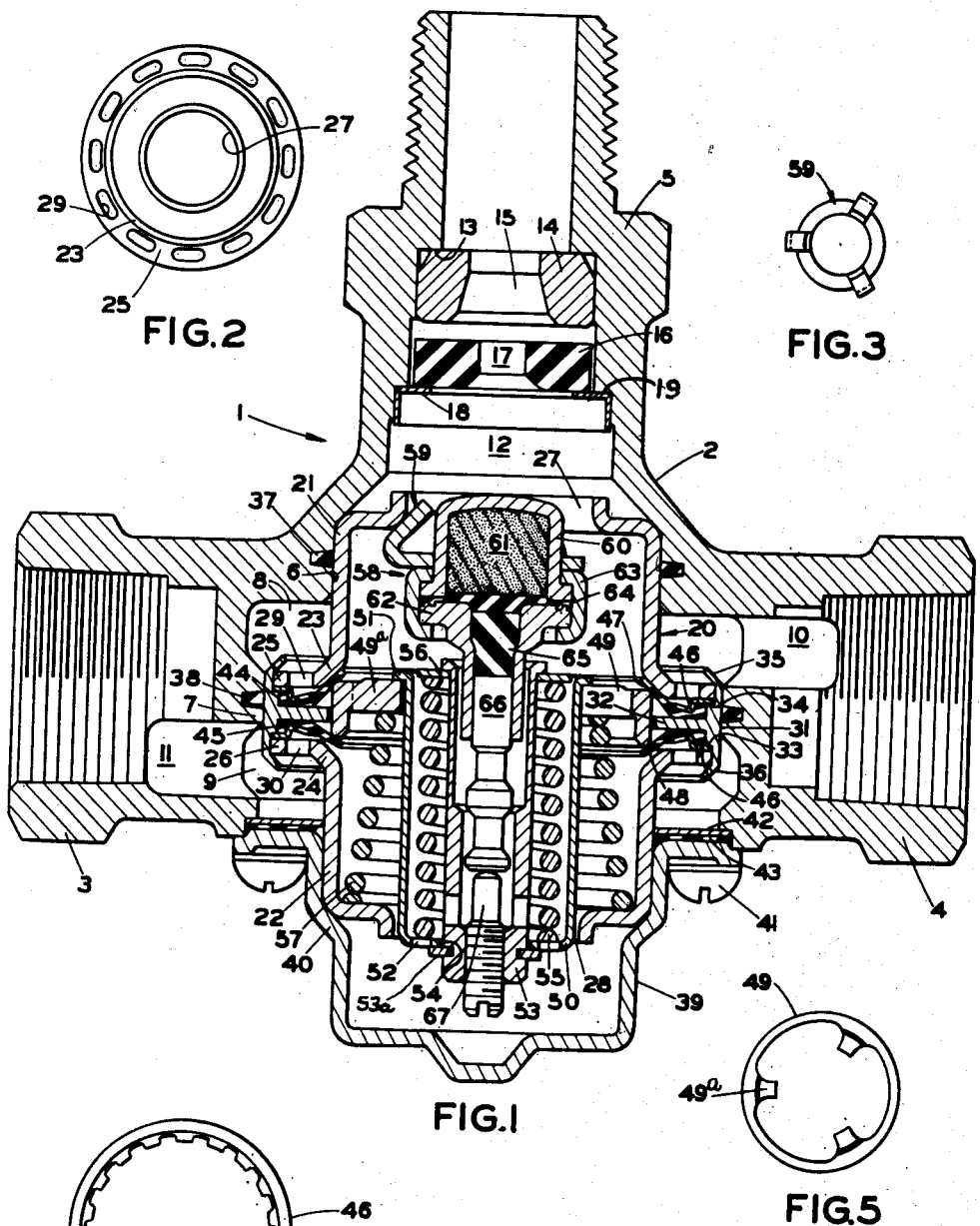

Nov. 3, 1953  A. VON WANGENHEIM  2,657,859
THERMOSTATIC MIXING VALVE
Filed Aug. 28, 1950  2 Sheets-Sheet 2

INVENTOR.

Patented Nov. 3, 1953

2,657,859

UNITED STATES PATENT OFFICE 2,657,859

THERMOSTATIC MIXING VALVE

Adolf Von Wangenheim, Detroit, Mich., assignor to Detroit Controls Corporation, Detroit, Mich., a corporation of Michigan Application August 28, 1950, Serial No. 181,741

20 Claims. (Cl. 236—12)

This invention relates to new and useful improvements in mixing valves in general and more particularly to thermostatically controlled mixing valves.

One of the objects of this invention is to provide a new and improved mixing valve.

Another object is to provide an improved thermostatic fluid mixing valve which may be readily assembled for commercial construction and is more efficient in operation than those heretofore produced.

Another object is to produce a mixing valve wherein the control valve also functions as a check valve in the event of a cessation of fluid supply.

Other objects will become apparent throughout the specification and claims as hereinafter related.

This invention consists of the new and improved construction and combination of parts and their cooperative relationship to be more fully described hereinafter, and the novelty of which will be particularly pointed out and distinctly claimed.

In the accompanying drawings, to be taken as a part of this specification, there is clearly and fully illustrated a preferred embodiment of this invention, in which drawings:

Figure 1 is a view in longitudinal cross section of a thermostatic mixing valve embodying this invention, Fig. 2 is a detail plan view of one of the cup-shaped members forming the inner valve casing shown in Fig. 1, Fig. 3 is a detail plan view of a spider element for supporting the power element of the valve as shown in Fig. 1, Fig. 4 is a detail plan view of an annular disc member shown in Fig. 1 which holds the flexible valve member in position, Fig. 5 is a detail plan view of a piston member shown in Fig. 1 which controls the opening of the flexible valve members, and Fig. 6 is a view in longitudinal cross section of a thermostatic mixing valve similar to that shown in Fig. 1 but of much simpler construction.

It should be noted that the detail views of Figs. 2, 3, 4 and 5 are drawn to a half scale compared to Fig. 1.

Referring to the drawings by characters of reference, and more particularly to Fig. 1, there is a mixing valve 1 comprising an outer casing 2 having a pair of inlet fittings 3 and 4 and an outlet fitting 5. There is a central cavity 6 in the casing 2 which opens through the wall of the casing and which has an annular partition member or rib 7 dividing the cavity 6 into a pair of spaced annular chambers 8 and 9 respectively. The chamber 8 communicates with the inlet fitting 4 through a passageway 10 and is operable to receive cold liquid. The chamber 9 communicates with the inlet fitting 3 through a passageway 11 and is operable to receive hot liquid. The cavity 6 opens into the outlet fitting 5 through an outlet passageway 12 which comprises a plurality of bores of different diameters so that a series of annular shoulders are produced in the outlet passageway 12. Positioned against the shoulder 13 adjacent the outlet fitting is an annular member 14 having a restricted flow passageway 15 therethrough. There is an annular member 16 of a flexible elastic and highly resilient material such as a rubber or synthetic rubber and which has a restricted flow passageway 17 extending therethrough and which is movable against the annular member 14 by fluid pressure. The elastic annular member 16 is held in position by an annular sleeve-type washer member 18 which is tightly fitted in the outlet passageway 12 against the shoulder 19. There is an inner valve casing 20 comprising a pair of cup-shaped hollow cylindrical and concentric members 21 and 22 which have flared portions 23 and 24 respectively at their open end portions terminating in flange portions 25 and 26 and which have concentric apertures 27 and 28 through their respective base portions. The flange portions 25 and 26 each have a plurality of ports 29 and 30 therein. There is an annular member 31 which has an interior annular rib member 32 and a pair of annular shoulders 33 and 34 which separate the flange portions 25 and 26 from each other. The annular member 31 has a pair of annular flanges 35 and 36 which secure the casing members 21 and 22 to the annular member 31 and to each other. The casing member 21 is fitted tightly into the outlet end portion of the cavity 6 and in sealing relation with a sealing washer or gasket member 37. The annular securing member 31 is tightly fitted in the annular partition member 7 and in sealing relation with a sealing washer or gasket 38 which prevents flow between the hot and cold liquid receiving chambers 8 and 9. There is a cup-shaped cover member 39 which closes the open end of the cavity 6 and which has an interior annular shoulder 40 which engages the end wall of the casing member 22 and functions to hold the inner casing 20 tightly in position. The cover member 39 is clamped into position against the casing wall by a plurality of bolts or screws 41 and there is provided an annular washer member 42 and a sealing gasket or washer 43 which are compressively seated against the wall of the casing 2 by the cover member 39 and which function to prevent leakage of liquid from the chamber 9. Positioned on opposite sides of the interior rib member 32 are a pair of annular valve members 44 and 45 which are secured at their outer peripheries by backing or washer members 46 which are compressively held by the respective flange portions 25 and 26 and the shoulders 33 and 34. The inner peripheral portions 47 and 48 of the valve members 44 and 45 are movably engageable with the flared portions 23 and 24 respectively and operate to control flow of liquid through the ports 29 and 30 respectively. The portions 47, 48 also serve as annular check valves, as hereinafter described. There is a movable piston or valve control member 49 which is guided by the annular rib 32 and movable between the flared portions 23 and 24 to control the extent of opening of the valve member movable portions 47 and 48 away from the flared portions 23 and 24. There is a guide member 50 for the piston 49 in the form of a cylindrical cup which has an annular flange 51 at its open end which engages the piston 49 on its upper surface and by which the piston is moved. The piston 49 is hollow to permit circulation of liquid therethrough for discharge through the outlet aperture 27. There is a plurality of finger members or projecting portions 49a which extend inwardly of the piston 49 and which are engaged by the flange 51 of the guide member 50. The guide member 50 is slidably positioned in the aperture 28 in the casing member 22 and functions to prevent the piston 49 from moving unevenly. There is a plurality of apertures 52 in the base portion of the guide member 50 which function to permit fluid to circulate freely within the inner casing 20. There is a hollow plunger 53 which extends through the interior of the guide member 50 and through a central aperture 54 in its base portion. The plunger 53 carries a washer member 53a in a peripheral groove at its lower end which abuts the lower end of the guide member 50 to limit upward movement of the plunger. The hollow plunger 53 is operatively connected to the guide member 50 for transmitting force by a helical spring 55, which seats at opposite ends on the end wall of the guide member 50 and a washer member 56 carried on the upper end of the hollow plunger 53. Movement of the piston 49 is opposed by a helical spring 57 which is carried by the end wall of the casing member 22 and is compressed against the underside of the piston 49. There is a thermostatic power element 58 positioned in the outlet end of the inner casing 20 and carried by a spider member 59 which is positioned against the wall of the outlet aperture 27. The thermostatic power element 58 comprises a hollow casing 60 which contains a temperature responsive material 61 and a cover member 62 which is held in position by an annular flanged securing member 63. There is a flexible diaphragm 64 clamped between the cover member 62 and the power element casing 60 which moves, upon expansion of the temperature responsive material 61, against a flexible elastic sponsive material 61, against a flexible elastic plug member 65 which in turn transmits the thrust to a plunger member 66. The plunger member 66 extends inside the hollow plunger 53 and transmits its thrust through an adjustable screw member 67 in the closed end of the hollow plunger 53. By adjustment of the screw member 67 the amount of travel of the plunger 66 necessary to actuate the device may be determined.

In operation this embodiment of the invention functions as follows:

This mixing valve is shown in a cold position instantaneously after liquid has been admitted therein. In the position shown in the drawing cold water is admitted through the inlet fitting 4 and the passageway 10 to the cold water chamber 8. Correspondingly hot water is admitted through the inlet fitting 3 and the passageway 11 to the hot water chamber 9. In the cold position as shown, the piston 49 is moved by the compression of the spring 57 to the position shown, holding the movable portion of the valve member 44 tightly against the flared portion 23 to prevent cold water from entering the casing 20. Hot water entering the chamber 9 in this position is permitted to enter the casing 20 through the ports 30 and through the open valve member movable portion 48 which has followed the piston 49 to the full open position. As hot water enters the casing 20 and circulates around the power element 58 the temperature responsive material in the power element will expand and acting through the plunger 66, the screw member 67, and the plunger 53 will cause the spring 55 to be compressed and to cause the guide member 50 to move the piston 49 against the resistance of the spring 57. The spring 55 also functions to permit overtravel of the plunger 53 to prevent damage to the valve member by the piston 49. As the piston 49 moves away from the flanged portion 23 the movable valve member portion 47 is permitted to open and to permit cold water to enter through the ports 29 from the chamber 8 to mix with the hot water entering the chamber 9. It should be obvious then that for any given power element and with any given setting of the screw 67 in the hollow plunger 53 a constant temperature will be maintained in the inner casing 20. If the temperature should rise above the setting of the valve the power element will cause the piston 49 to move towards a cooler position, that is, to partially close the hot water control valve 45 and to permit more cold water to enter past the cold water controlling valve 44. Correspondingly, if the temperature of the mixed fluid within the casing 20 drops below the setting of the valve the piston 49 will move in the opposite direction permitting more hot water to enter the casing to restore the desired temperature conditions.

The resilient and compressible member 16 is operable to be moved by liquid pressure and compressed into the passage 15 to restrict flow therethrough. In normal operation this member maintains a constant outlet opening but when pressure surges occur in the liquid supply line the member is compressed to restrict liquid outflow and thus equalize flow during such surges. This member, although useful in this valve structure, is not claimed as a part of this invention as it is the subject of Patent 2,454,929 to L. A. Kempton.

It should be noted that the movable valve member portions 47 and 48 also function as check valves in the event of a cessation of fluid supply from either or both of the inlets. The movable portions 47 and 48 are stressed to follow the piston 49 by the backing members 46 but if there is a cessation of fluid supply the back flow or back pressure through the valves would cause the portions 47 and 48 to seat against the flared portions 23 and 24 respectively.

In the form of the invention shown in Fig. 6 this mixing valve is greatly simplified and the number of parts therein greatly reduced. In this valve there is provided a valve casing 101 having inlet nipples or fittings 102 and 103 and an outlet nipple or fitting 104. These fittings enclose passages 105, 106 and 107 respectively. The outlet fitting 104 is a part of a cover member 108 for the casing 101 which is removable for insertion and removal of the power element and valve structure similar to the cover 39 used in the valve shown in Fig. 1. Within the casing 101 there is provided a pair of annular grooves or chambers 109 and 110 which are respectively connected by passages 111 and 112 with the inlet passages 106 and 105. The chambers 109 and 110 in the valve casing are separated by an internal rib 113 having a shoulder 114 on which is secured a sealing washer 115 by a sealing ring member 116. In the closed end of the casing 101 there is a cylindrical recess 117 in which is secured as by a press fit an annular valve seat member 118 having a valve seat portion 119. The removable cover member 108 has a recess 120 concentrically alined with the recess 117 on the opposite side of the casing therefrom and has secured therein a cup-shaped annular valve seat member 121 providing a valve seat 122 and secured in the member 108 as by a press fit. In this construction the valve seat members 118 and 121 serve the purpose of the cup-shaped casing members 22 and 23 in the valve shown in Fig. 1. The cup-shaped valve seat member 121 is provided with a plurality of apertures 123 for flow from the interior of the valve casing to the outlet passage 107. This member also has a central aperture which receives and holds in position a power element 124 which is substantially identical to the power element 58 shown in Fig. 1. A cylindrical valve member 125 is slidably positioned within the casing 101 and is cooperable at opposite ends with the annular valve seats 119 and 122 respectively to control flow of liquid from the chambers 109 and 110 respectively. In this construction the sealing washer or gasket 115 prevents cross flow from the chamber 109 to the chamber 110 in a manner similar to the sealing washer 38 shown in Fig. 1. The valve 125 has an annular shoulder 126 at one end which supports one end of a spring 127 the other end of which abuts a movable disc-shaped plate member 128 and holds the same in position against an annular retaining ring 129. A spring 130 is supported at its lower end on the valve seat member 118 and abuts at its upper end the movable plate 128 to urge the valve member 125 toward engagement with the upper valve seat 122. The power element 124 has a guide sleeve portion 131 similar to the sleeve member 62 shown in Fig. 1 and which guides a thermostatically actuated piston 132 engageable with the plate member 128 for moving the valve member 125. The removable outlet cover member 108 is held in position by any suitable clamping means such as a plurality of bolts (not shown) and abuts a sealing gasket 133 set in an annular recess around the open end of the valve casing 101. Each of the inlet passages 105 and 106 has a strainer member 134 therein. Each of these passages is also equipped with a check valve member 135 which comprises a cup-shaped supporting member 136 and a rubber check valve member 137 having flapper disc portions (not shown) cooperable with the cup-shaped member 136 as check valves and held in position by rubber lugs 138. The check valve structure 135 while useful in this valve construction does not form a part of the present invention and is more fully described and claimed in my co-pending application, Serial No. 169,196 filed June 20, 1950.

The operation of this valve is substantially identical to that of the valve shown in Fig. 1 and should be apparent from the foregoing description but will be set forth more completely for greater clarity of description.

This valve while greatly similar to that shown in Fig. 1 is characterized by its simplicity of construction and a great reduction in the number of parts used therein. In this construction the check valve units 135 replace the annular check valve members shown in the valve shown in Fig. 1. Hot water is conducted through the valve through the inlet 105, the passage 112 and the annular chamber 110. Cold water is conducted into the casing through the inlet passage 106, the passage 111 and annular chamber 109. In the position shown the valve is cold and the spring 130 has moved the valve member 125 to completely close the cold inlet and permit only hot water to enter the casing and flow out through the outlet passage 107. As the hot water flows over the power element 124 and heats it, the piston 132 will move away from the sleeve portion 131. The movement of the piston 132 away from the sleeve portion 131 will move the valve member 125 to partially close the hot water inlet from passageway 110 and partially open the cold water inlet from passageway 109. The mixture of hot and cold water flowing over the power element 124 will regulate the piston 132 so that the valve 125 will be positioned to permit water at a predetermined temperature to flow through the outlet 107. If excessive hot water is allowed to enter the valve casing so that the power element 124 is overheated the valve member 125 will be moved until it engages the valve seat 119 and the spring 127 will then be collapsed by further movement of the plate member 128. This arrangement provides a lost motion upon overheating of the power element to prevent damage to the valve. In this form of valve the flow controlling washer member 16 of the valve shown in Fig. 1 is not provided but if required can be provided by a special fitting on the outlet nipple 104 enclosing such flow responsive member.

From the foregoing description it should be apparent that there is herein provided a valve construction which is very similar to that shown in Fig. 1 but utilizing fewer parts and a simpler construction providing greater ease of assembly and disassembly.

Although in this invention there has been described only two embodiments thereof it will be obvious to those skilled in the art that other embodiments of this invention or modifications thereof will be possible without departing from the intent and scope of the invention which is intended to be limited only by the appended claims.

This application is a continuation-in-part of my co-pending application, Serial No. 788,474 filed November 28, 1947, for Mixing Valve, now abandoned.

Having thus described the invention, what is claimed and is desired to be secured by Letters Patent of the United States is:

1. In a valve of the character described, a valve casing having an annular inlet portion, said casing having a central chamber for receiving fluid, a plurality of ports in said casing interconnecting said annular inlet portion and said central chamber; an annular valve member of a flexible, elastic, and highly resilient material positioned in said central chamber; said valve member being secured to the wall of said central chamber at one part and having another part movably engageable with the wall of said central chamber adjacent said ports and operable to control flow of fluid from said ports, a piston member movable relative to said movable valve member part and engageable therewith to determine the position of said movable part relative to said ports, and a thermostatic power element responsive to fluid temperature in said central chamber and operable to move said piston member to engage and flex said movable valve member part to seat in opposition to fluid flow upon the occurrence of a predetermined fluid temperature in said central chamber.

2. In a valve of the character described, a valve casing having a pair of valve ports for receiving two streams of fluid at different temperatures for mixing; a valve member for each port of a flexible, elastic, and highly resilient material; each of said valve members being secured to said casing at one part and having another part movable to control fluid flow through said valve ports, each of said valve members being operable to close its port by back pressure thereagainst upon cessation of fluid flow through said port, a member movable relative to said movable valve member parts and engageable therewith to determine the position of said movable parts relative to said valve ports, said movable member being operable upon movement to engage and begin a closing movement of one of said movable parts and to move away from and permit an opening movement of the other of said movable parts, and a thermostatic power element cooperable with said movable member and operable to move the same in response to the temperature of fluid in said casing.

3. In a valve of the character described, a valve casing having a pair of annular inlet recesses for receiving two streams of fluid at different temperatures, said casing having a central chamber for mixing the fluid from said annular recesses, a plurality of ports in said casing interconnecting said annular recesses and said central chamber; a pair of annular valve members of a flexible, elastic, and highly resilient material positioned in said central chamber for controlling flow of fluid from said annular recesses; each of said valve members being secured to the wall of said central chamber at one part and having another part movably engageable with the wall of said central chamber adjacent the ports from the respective annular recesses and operable to control fluid flow from said ports, said valve members being operable to close their respective ports by back pressure of fluid upon cessation of fluid flow through said ports, a movable piston member positioned between and cooperable with each of said movable valve member parts and operable to determine the position of said movable parts relative to their respective ports, a thermostatic power element positioned in said central chamber and responsive to the temperature of mixed fluid therein, and said power element being cooperable with said movable piston member and operable to move the same to determine the relative positions of said movable valve member parts.

4. In a valve of the character described, a valve casing comprising two cup-shaped parts each having an annular flange portion around the open end thereof, means securing said parts together and spacing said flange portions from each other, one or more ports in each of said flange portions for admitting fluid to the interior of said casing, a valve member movable between said flange portions and operable to determine the amount of fluid entering said casing through the ports in either of said flange portions, a thermostatic power element positioned within said casing and responsive to the temperature of fluid therein, and said power element being cooperable with said valve member and operable to move the same to determine its position relative to each of said flange portions.

5. In a valve of the character described, a valve casing comprising a pair of cup-shaped parts each having an annular flange portion around the open end thereof and an aperture through the base portion thereof, means securing said parts together and spacing said flange portions from each other, one or more ports in each of said flange portions for admitting fluid to the interior of said casing, a valve member movable between said flange portions and operable to determine the amount of fluid entering said casing through the ports in either of said flange portions, a thermostatic power element positioned within said casing and responsive to the temperature of fluid therein, a supporting spider member for said power element positioned against the wall of one of said apertures, a guide member for said valve member positioned through and guided in the other of said apertures, and said power element being cooperable with said valve member and operable to move the same to determine its position relative to each of said flange portions.

6. In a valve of the character described, a valve casing comprising a pair of cup-shaped parts each having a flared portion terminating in a flange portion around the open end thereof, means securing said parts together and spacing said flange portions from each other, one or more ports in each of said flange portions for admitting fluid to the interior of said casing, a pair of flexible valve members of a highly resilient material each secured at one part to said securing means and having another part movably engageable with said flared portion for controlling flow of fluid through said ports, a control member movable between said flared portions and operable to determine the extent of opening of each of said movable valve member parts and thereby determining the amount of fluid entering through the ports in the respective flange portions, a thermostatic power element positioned within said casing and responsive to the temperature of fluid therein, and said power element being cooperable with said control member and operable to move the same to determine its position relative to each of said flared portions.

7. In a valve of the character described, a valve casing comprising a pair of cup-shaped parts each having a flared portion terminating in a flange portion around the open end thereof and having an aperture through the base portion thereof, an annular member having a pair of flanged edge portions for securing said parts together and having an annular rib portion for spacing said casing flange portions from each other, one or more ports in each of said casing flange portions for admitting fluid to the interior of said casing; a pair of annular valve members of a flexible, elastic, and highly resilient material; said valve members being secured at their respective outer peripheries on opposite sides of said rib portion between said casing flange portions and said ribs portion and having their inner peripheries movably engageable with said flared portions for controlling flow of fluid through said ports, a hollow piston guided by said rib portion and movable between said flared portions and engageable with said inner peripheries to determine the extent of opening of said valve member inner peripheries away from said flared portions and thereby determining the amount of fluid entering through the ports in the respective casing flange portions, a thermostatic power element positioned within said casing and responsive to the temperature of fluid therein, a spider member positioned against the wall of one of said casing apertures for supporting said power element, a plunger acutated by said power element, a guide member for said hollow piston in the form of a cup-shaped member having a flanged edge engaging said piston and having a cylindrical body portion slidably guided in the other of said casing apertures, a spring positioned between said plunger and the base portion of said guide member for transmitting the thrust of said power element to said piston and to allow for over-travel of said plunger, a spring resisting movement of said piston, and said power element being operable to move said piston against the opposition of said last-named spring and being operable to determine the position of said piston relative to each of said flared portions.

8. In a valve of the character described, an outer casing having an inlet and an outlet and having a central chamber therein, said casing having an annular chamber communicable with said inlet and located adjacent said central chamber, an inner casing having a valve port communicating with said annular chamber, said inner casing being positioned in said central chamber; a valve member of a flexible, elastic, and highly resilient material; said valve member being secured to said inner casing at one part and having another part movable to control fluid flow through said valve port from said annular chamber, a movable member cooperable with said movable valve member part and operable to determine the position of said movable part relative to said valve port, and a thermostatic power element responsive to fluid temperature in said inner casing and operable to move said movable member to cause said movable valve member part to seat in opposition to fluid flow upon the occurrence of a predetermined fluid temperature in said inner casing.

9. In a valve of the character described; an outer valve casing having a pair of inlets, an outlet, and a central cavity; an inner valve casing comprising two cup-shaped parts each having an annular flange portion around the open end thereof, means securing said parts together and spacing said flange portions from each other, one or more ports in each of said flange portions, said inner valve casing being tightly fitted in said cavity, an annular chamber in said outer casing intercommunicating one of said inlets and the ports in one of said flange portions, a second annular chamber in said outer casing intercommunicating the other of said inlets and the ports in the other of said flange portions, a cover member for said cavity rigidly enclosing said inner casing within said outer casing, a valve member movable between said flange portions and operable to determine the amount of fluid entering said inner casing through the ports in either of said flange portions, a thermostatic power element positioned within said inner casing and responsive to the temperature of fluid therein, and said power element being cooperable with said valve member and operable to move the same to determine its position relative to each of said flange portions.

10. In a valve of the character described; an outer valve casing having a pair of inlets, an outlet, and a central cavity; an inner valve casing comprising two cup-shaped parts each having a flared portion terminating in a flange portion around the open end thereof and having an aperture through the base portion thereof, said inner casing being tightly fitted into said cavity with one of said apertures opening into said outlet, a cover member for said cavity operable to hold said inner casing tightly in position, an annular member securing said cup-shaped parts together and spacing said flange portions from each other, said annular member engaging the wall of said cavity in a sealing relation and forming with the wall of said cavity and said inner casing a pair of annular chambers, each of said inlets being communicable with one of said annular chambers, one or more ports in each of said flange portions intercommunicating said annular chambers and the interior of said inner casing, a pair of flexible valve members of a highly resilient material each secured at one part by said annular member and having another part movably engageable with said flared portion for controlling flow of fluid through said ports, a piston movable between said flared portions and guided by said annular member and cooperable with said movable valve member parts to determine the extent of opening movement of each relative to said flared portions, a thermostatic power element positioned within said inner casing and responsive to the temperature of fluid therein, a spider member for supporting said power element positioned against the wall of said outlet aperture, a guide member for said piston slidably positioned in the other of said apertures, and said power element being cooperable with said piston and operable to move the same to determine its position relative to each of said flared portions.

11. A mixing valve comprising outer and inner casings, said outer casing having a pair of oppositely extending alined inlet members, a central cylindrical cavity extending transversely to said inlet members and opening through a wall of said casing, an annular partition member in said cavity through which said inner casing fits, said partition member and said inner casing separating said cavity into spaced hot and cold liquid receiving chambers; said inner casing comprising a pair of cylindrical cup-shaped members each having a flared portion terminating in a flange portion at the open end thereof, one or more ports in each of said flange portions, an annular member securing said cup-shaped members together and spacing said flange portions from each other, an outlet opening at one end of said outer casing, said cavity opening at one end into said outlet opening, one of said cup-shaped members fitting the outlet end of said cavity, said annular securing member fitting in said annular partition, said ports intercommunicating said hot and cold chambers and the interior of said inner casing, thermostatic operated valve means for controlling flow of fluid through said ports, a cup-shaped cover member closing said casing opening and having an internal annular shoulder engaging the end portion of said other cup-shaped casing member, said cover member having a flange seating against said casing, and means clamping said last-named flange to said casing and acting through said cover member to hold said inner casing tightly in position.

12. A valve structure comprising two hollow cylindrical concentric members each having an open end and having their adjacent open end portions in spaced relation, each of said end portions having a valve seat concentric with its open end, a partition member having an annular inwardly directed flange positioned between and spaced from said end portions and forming separate inlets one to each of said concentric members, said partition member having oppositely directed abutments receiving said concentric members, flanges on said partition member and extending beyond said abutments on opposite sides of said annular flange and engaged with and holding said concentric members rigidly together, valve means having a continuous wall slidably fitting within said annular flange, said wall having valve portions movable toward and from said seats for controlling flow through said inlets, and means to move said valve means.

13. A valve structure comprising two hollow cylindrical concentric members each having an open end and having their adjacent open end portions in spaced relation, each of said end portions having a valve seat concentric with its open end, a partition member having an annular inwardly directed flange positioned between and spaced from said end portions and forming separate inlets one to each of said concentric members, said partition member having oppositely directed abutments receiving said concentric members, flanges on said partition member and extending beyond said abutments on opposite sides of said annular flange and engaged with and holding said concentric members rigidly together, valve means having a continuous wall slidably fitting within said annular flange, said wall having valve portions movable toward and from said seats for controlling flow through said inlets, an annular check valve member of resilient elastic, impervious material secured and sealed along its outer periphery to said annular flange and having its inner peripheral portion extending into overlapping relation to one of said concentric member open end portions for seating engagement therewith, and means to move said valve means.

14. In a valve of the character described; a valve casing having a pair of inlets for hot and cold water, a central chamber for mixing water to a desired temperature, and an outlet for discharging mixed water from the casing; said casing having a pair of annular grooves surrounding said central chamber and communicable one with each of said inlets, a pair of cylindrical valve seat members positioned in said casing and providing annular valve seats, said valve seat members cooperating with said grooves to provide annular chambers and defining inlets to said central chamber, a cylindrical valve member in said central chamber having opposite ends cooperable upon movement with one or the other of said valve seats, and a thermostatic power element supported in the outlet end of said central chamber and cooperable with said valve member to modulate the position of the same between said valve seats in accord with mixed water temperature.

15. A valve as defined in claim 14 having check valves therein controlling flow in said inlets and operable to be closed in the event of an outward flow of water through either of said inlets.

16. A valve as defined in claim 14 having therein means including a lost-motion spring operable to transmit movement of said power element to said valve member and operable to permit continued movement of said power element after engagement of said valve member with one of said valve seats.

17. In a mixing valve, a valve casing comprising a body portion and a closure member; said casing having a pair of inlets for hot and cold water, a central chamber for mixing water to desired temperature, and an outlet for discharging mixed water therefrom; said body portion and said closure member having alined opposite cylindrical recesses, a pair of cylindrical valve seat members positioned one in each of said recesses and providing spaced annular valve seats, said casing having a pair of annular grooves surrounding said central chamber adjacent said valve seat members and forming therewith annular chambers communicable one with each of said inlets, a cylindrical valve member in said central chamber having end edges cooperable one with each of said valve seats and movable therebetween, and an expansible thermostatic power element supported in the outlet end of said central chamber and operatively connected to said valve member to modulate the position thereof between said valve seats in accord with mixed water temperature.

18. A valve as defined in claim 17 having check valves therein controlling flow in said inlets and operable to be closed in the event of an outward flow of water through either of said inlets.

19. In a mixing valve, a valve casing comprising a body portion and a closure member; said casing having a pair of inlets for hot and cold water, a central chamber for mixing water to desired temperature, and an outlet for discharging mixed water therefrom; said body portion and said closure member having alined opposite cylindrical recesses, a pair of cylindrical valve seat members positioned one in each of said recesses and providing spaced annular valve seats, said casing having a pair of annular grooves surrounding said central chamber adjacent said valve seat member and forming therewith annular chambers communicable one with each of said inlets, means including an annular rib in said casing and a sealing gasket preventing flow between said annular chambers, a cylindrical valve member in said central chamber having end edges cooperable one with each of said valve seats and movable therebetween, and an expansible thermostatic power element supported in the outlet end of said central chamber and operatively connected to said valve member to modulate the position thereof between said valve seats in accord with mixed water temperature.

20. A valve as defined in claim 19 wherein said closure member includes said outlet, said power element being supported by the valve seat member in said closure member, said valve seat members being fixed in said recesses by a pressed fit, and said valve member being slidably guided by said rib and including a lost motion transmitting spring to permit overtravel of said power element without damage to said valve member or valve seat member.

ADOLF VON WANGENHEIM.

References Cited in the file of this patent

UNITED STATES PATENTS

| Number | Name | Date |
|---|---|---|
| 453,017 | May | May 26, 1891 |
| 833,973 | Petsche | Oct. 23, 1906 |
| 1,635,559 | Rockwell | July 12, 1927 |
| 1,819,045 | Snediker | Aug. 18, 1931 |
| 1,934,499 | Hall | Nov. 7, 1933 |
| 1,940,090 | Hetherington | Dec. 19, 1933 |
| 2,199,129 | Hamilton | Apr. 30, 1940 |
| 2,205,334 | Barnes | June 18, 1940 |
| 2,308,165 | Fields | Jan. 12, 1943 |
| 2,533,769 | Kempton | May 22, 1951 |
| 2,558,962 | Kempton | July 3, 1951 |

FOREIGN PATENTS

| Number | Country | Date |
|---|---|---|
| 234,563 | Great Britain | June 4, 1925 |